Patented Aug. 22, 1933

1,923,630

UNITED STATES PATENT OFFICE 1,923,630

TREATMENT OF HYDROCARBONS

Cloyd D. Looker and Ernest B. Kester, Nitro, W. Va., Henry B. Hass, La Fayette, Ind., and Wayne Z. Friend, South Sudbury, Mass., assignors to The Baltimore Gas Engineering Corporation, a Corporation of Maryland No Drawing. Application February 27, 1930
Serial No. 431,954

10 Claims. (Cl. 260—116)

The present invention relates to the treatment of hydrocarbons with oxyhalides of nitrogen to produce a series of useful products. This application refers particularly to treatment of the hydrocarbons in the liquid phase. Preferably, the action is effected at a relatively high temperature and/or pressure, this being the most satisfactory method of proceeding when the hydrocarbon is kept in the liquid phase. The reaction may be carried out without the presence of sufficient light to produce a material effect.

While the present invention is applicable to hydrocarbons in general, i. e., either the aromatic or non-benzenoid classes, it is especially valuable for the treatment of such hydrocarbons as methane, ethane, propane, isobutane, butane, pentane, hexane and the like, all these coming under the generic term, "paraffins".

In general, those paraffins in the series up to and including butane are gaseous under ordinary atmospheric pressures and temperatures. Pentane and those boiling at a higher temperature are usually considered liquid at ordinary temperatures and pressures. While oxyhalides of nitrogen in general have been found to be valuable in treating hydrocarbons in accordance with this invention, the oxychlorides of nitrogen and especially nitrosyl chloride have been found to be particularly valuable. By the treatment of hydrocarbons and especially paraffins in accordance with the above and as more specifically hereinafter pointed out, there may be obtained either directly or indirectly a number of products including halogenated hydrocarbons, alcohols, acidic substances, ketones, esters, aldehydes, hydrogen halides and various other products.

More specifically, in treating butane with nitrosyl chloride in accordance with the present invention and this compound as set forth above is illustrative of a series of compounds which may be so treated, there are obtained a number of products including butyric acid, propionic acid, acetic acid, methyl ethyl ketone, hydroxylamine hydrochloride, ammonium chloride, normal butyl chloride, secondary butyl chloride, 2,2-dichlorobutane and other derivatives of butane from which esters, ethers and alcohols valuable in the lacquer, perfumery, food and other arts may be derived.

We wish to point out some other specific examples of hydrocarbons and oxyhalides of nitrogen so that those skilled in the art may more readily realize the breadth and extent of this invention. As examples of hydrocarbons in general, we name: benzol, toluol, cyclohexane, butylene and pentane. As examples of non-benzenoid hydrocarbons: amylene, butylene, butane and pentane. As examples of normally gaseous paraffin hydrocarbons: methane, ethane, propane and butane. As examples of normally liquid paraffin hydrocarbons: pentane, isopentane and hexane. As examples of oxyhalides of nitrogen: nitrosyl bromide, nitroxyl fluoride, nitrosyl chloride. As examples of oxychlorides of nitrogen: nitrosyl chloride and nitryl chloride.

The reaction using butane and nitrosyl chloride as the reaction materials in this example may be carried out in Pyrex glass tubes, metal tubes or autoclaves especially lined with a material resistant to the reaction mixture and products of the reaction; for example, tantalum. To cite a specific case, in carrying out the reaction in heavy Pyrex glass tubes, the latter may be filled with equimolecular weights of butane and nitrosyl chloride. The mixing of the reagents and their transfer into the glass tubes must be carried out at reduced temperatures because of the high vapor pressure of butane and nitrosyl chloride. It is to be understood that ratios of the two reactants may be varied at the will of the operator.

After the filling, the tubes may be sealed and inserted in heavy metal protecting tubes. We have caused the reaction to proceed after the reacting mixture is sealed in the glass tube by varying several of the conditions. The metal pipes, of course, completely exclude the light. Some of these tubes have been placed in an oven where a temperature greater than 20° C. has been maintained for several hours. Others have been placed in an oven where a temperature of 100° C. or more has been maintained. The time usually required for the reaction to go to completion at this higher temperature is in excess of one hour. Other glass tubes have been exposed directly to the sunlight without being enclosed in the metal casing. In some instances the temperature, when the tubes were exposed, has been greater than 20° C. In others, the temperature has been greater than 100° C.

Pressures greater than 1 atmosphere and greater than 8 atmospheres have been maintained on tubes in the light and without the influence of light. In every case a reaction took place, the rate depending upon the degree of pressure, temperature, light, etc.

Nitrosyl chloride mixed with butane has a reddish appearance. The existence of a reaction may be foretold by the formation of very small gas bubbles which continue to rise to the top during the reaction and by the fact that after a certain length of time 2 layers are gradually formed within the reaction mixture. The reddish color gradually changes. These layers are identified as a lower layer and an upper layer. Each of the layers at the end of the reaction and when no excess nitrosyl chloride remains is pale straw color, the lower being miscible with water in all proportions.

During the reaction in each case considerable pressure is developed in excess of that due to the vapor pressure of the starting materials. Proceeding in accordance with the above, it is noted that the reaction takes place in the liquid phase under pressure and at temperatures above 20° C. and preferably above 100° C., with or without the presence of light. A large part of our work has been carried out at pressures above 8 atmospheres and we have noted pressures as high as 65 atmospheres. Of course temperatures must not exceed the point where there is an appreciable decomposition of the reaction products, which point is usually above 250° C. and sometimes above 450° C. Such temperatures and pressures are relatively high as compared to standard conditions of 0° C. and 14.4 pounds. As the reaction progresses, crystals of ammonium chloride are deposited upon the walls of the reaction chamber.

Other normally gaseous paraffins such as methane, ethane and propane may be reacted with nitrosyl chloride and a series of useful products produced corresponding to those obtained by reacting nitrosyl chloride with butane. The reaction may be carried out in the liquid phase in glass or metal tubes as already explained so long as the critical temperature and pressure are not exceeded.

Not only oxyhalides of nitrogen but also some of the products of the reaction are extremely corrosive. It has been found by experimentation that tubes, autoclaves or other apparatus made of or lined with metallic tantalum are suitable for use in the reaction. Tantalum can be rolled into very thin sheets and used as a lining where great strength in the reacting chamber or vessel is necessary.

Using the reaction between nitrosyl chloride and butane again as the example, the reaction product, the entire condensate, composed of a lower layer, which is water miscible and an upper layer, which is substantially water immiscible is refluxed with a suitable hydrolyzing agent, preferably a concentrated acid such as hydrochloric acid which is present as a constituent. In the presence of the hydrolyzing agent oximes are hydrolyzed to ketones and aldehydes, and nitriles to fatty acids. After hydrolysis, the water miscible layer is separated from the water immiscible portion mechanically and fractionally distilled. We obtain thereby methyl ethyl ketone, acetic acid, propionic acid, butyric acid and hydrochloric acid. The residue is composed mainly of ammonium chloride and hydroxylamine hydrochloride.

The unhydrolyzable water immiscible portion is extracted with alkali to remove acidic substances and the remainder is subjected to fractional distillation. By this method, we isolate primary butyl chloride, secondary butyl chloride, 1,1-dichlorobutane, 2,2-dichlorobutane and other polychlorobutanes.

The portion removed from the water immiscible portion by the alkali is treated by the usual chemical methods to recover the acetic, propionic and butyric acids.

As indicated, while nitrosyl chloride is the preferred material, the reaction may be carried out by employing other oxyhalides of nitrogen.

In treating hydrocarbons in accordance with the present invention, satisfactory results are obtained by using pure nitrosyl chloride obtained by passing liquid sulphur dioxide into fuming nitric acid and distilling the nitrosyl sulfuric acid so formed with sodium chloride. It may be stated that the purity of the nitrosyl chloride influences the course of the reaction and to some extent the character of the reaction products.

What is claimed is:

1. The process of producing hydrocarbon derivatives comprising treating a paraffin hydrocarbon in the liquid phase with an oxyhalide of nitrogen, without the presence of sufficient light to materially affect the reaction, the reaction being carried out at a temperature above 20° C. but below the point where decomposition of the reaction products begins.

2. The process of producing hydrocarbon derivatives comprising treating a paraffin hydrocarbon in the liquid phase with an oxyhalide of nitrogen, without the presence of sufficient light to materially affect the reaction, at a temperature above 100° C. but below the point where decomposition of the reaction products begins.

3. The process of producing hydrocarbon derivatives comprising treating a paraffin hydrocarbon in the liquid phase with nitrosyl chloride, without the presence of sufficient light to materially affect the reaction, the reaction being carried out at a temperature above 100° C. but below the point where decomposition of the reaction products begins.

4. The process of producing hydrocarbon derivatives comprising treating a normally gaseous paraffin hydrocarbon in the liquid phase with an oxyhalide of nitrogen, without the presence of sufficient light to materially affect the reaction, at a temperature above 20° C. but below the point where decomposition of the reaction products begins.

5. The process of producing hydrocarbon derivatives comprising treating normally gaseous paraffin hydrocarbons in the liquid phase with nitrosyl chloride without the presence of sufficient light to materially affect the reaction at temperatures above 20° C. but below the point where decomposition of the reaction products begins.

6. The process of producing hydrocarbon derivatives comprising treating a substance consisting essentially of paraffine hydrocarbons in the liquid phase with nitrosyl chloride at a temperature above 20° C. but below the point where decomposition of the reaction products begins.

7. The process of producing hydrocarbon derivatives comprising treating butane in the liquid phase with nitrosyl chloride at a temperature above 100° C. but below the point where decomposition of the reaction products begins.

8. The process of producing hydrocarbon derivatives comprising treating butane in the liquid phase with nitrosyl chloride, without the presence of sufficient light to materially affect the reaction, at temperatures above 20° C. but below a temperature sufficient to decompose the chlorinated hydrocarbons and fatty acids formed during the time of the reaction.

9. The process of producing hydrocarbon derivatives comprising treating at a temperature above 20° C. but below the point where decomposition of the reaction products begins a paraffin hydrocarbon in the liquid phase with an oxychloride of nitrogen without the presence of sufficient light to materially affect the reaction and thereafter recovering from the reaction product alkyl chlorides and fatty acids.

10. The process of producing hydrocarbon derivatives comprising treating without the presence of sufficient light to materially affect the reaction, a paraffin hydrocarbon with nitrosyl chloride in the liquid phase at a temperature above 20° C. but below the point where decomposition of the chlorinated and oxidized products begins and thereafter recovering from the reaction product oxidized hydrocarbon, chlorinated hydrocarbon and compounds of nitrogen.

CLOYD D. LOOKER.
ERNEST B. KESTER.
HENRY B. HASS.
WAYNE Z. FRIEND.